Dec. 22, 1931.    R. J. WIGHTMAN ET AL    1,837,306
LIQUID HEATING APPARATUS
Filed Dec. 26, 1930    4 Sheets-Sheet 2
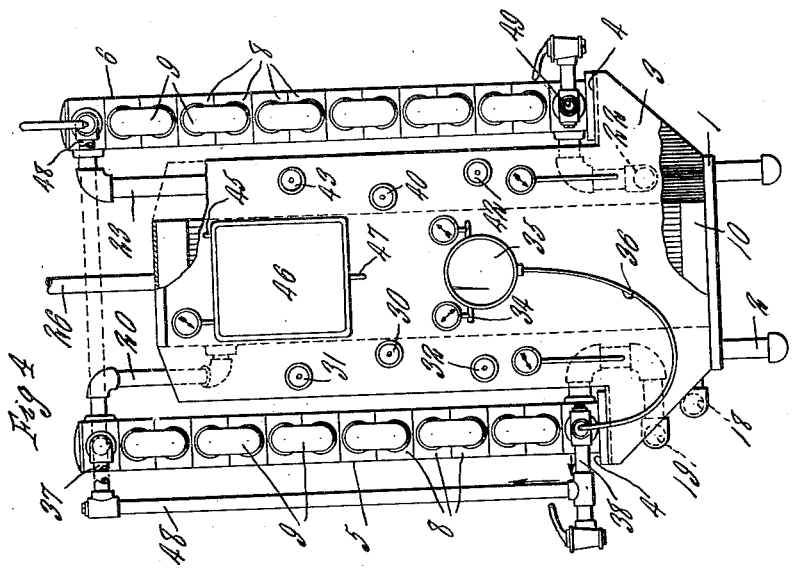
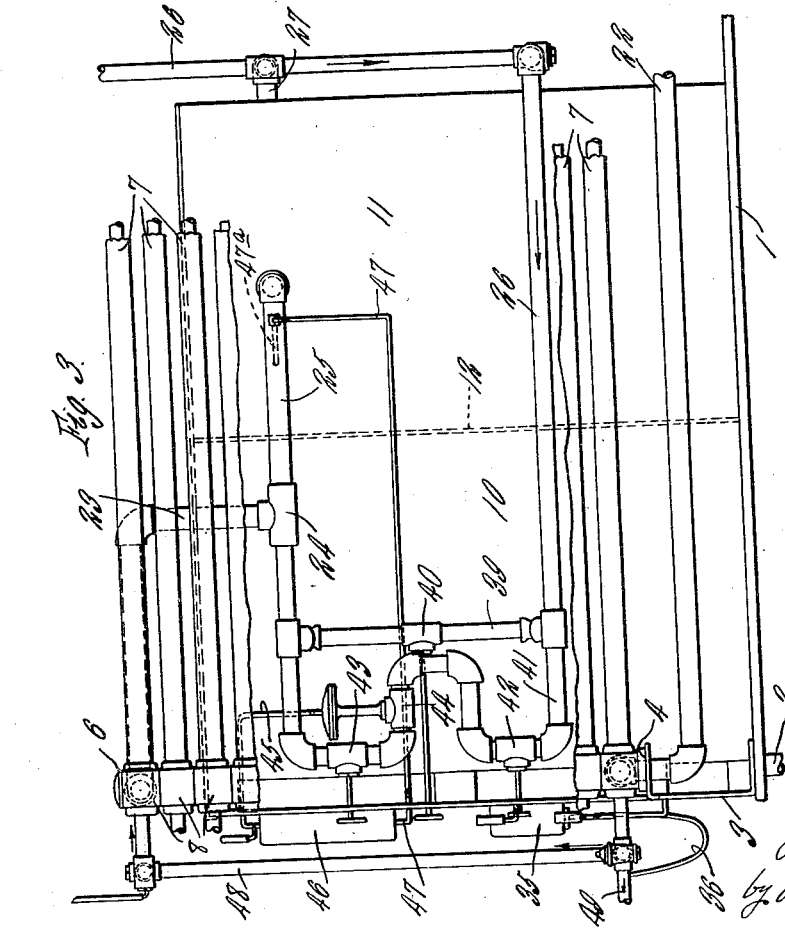

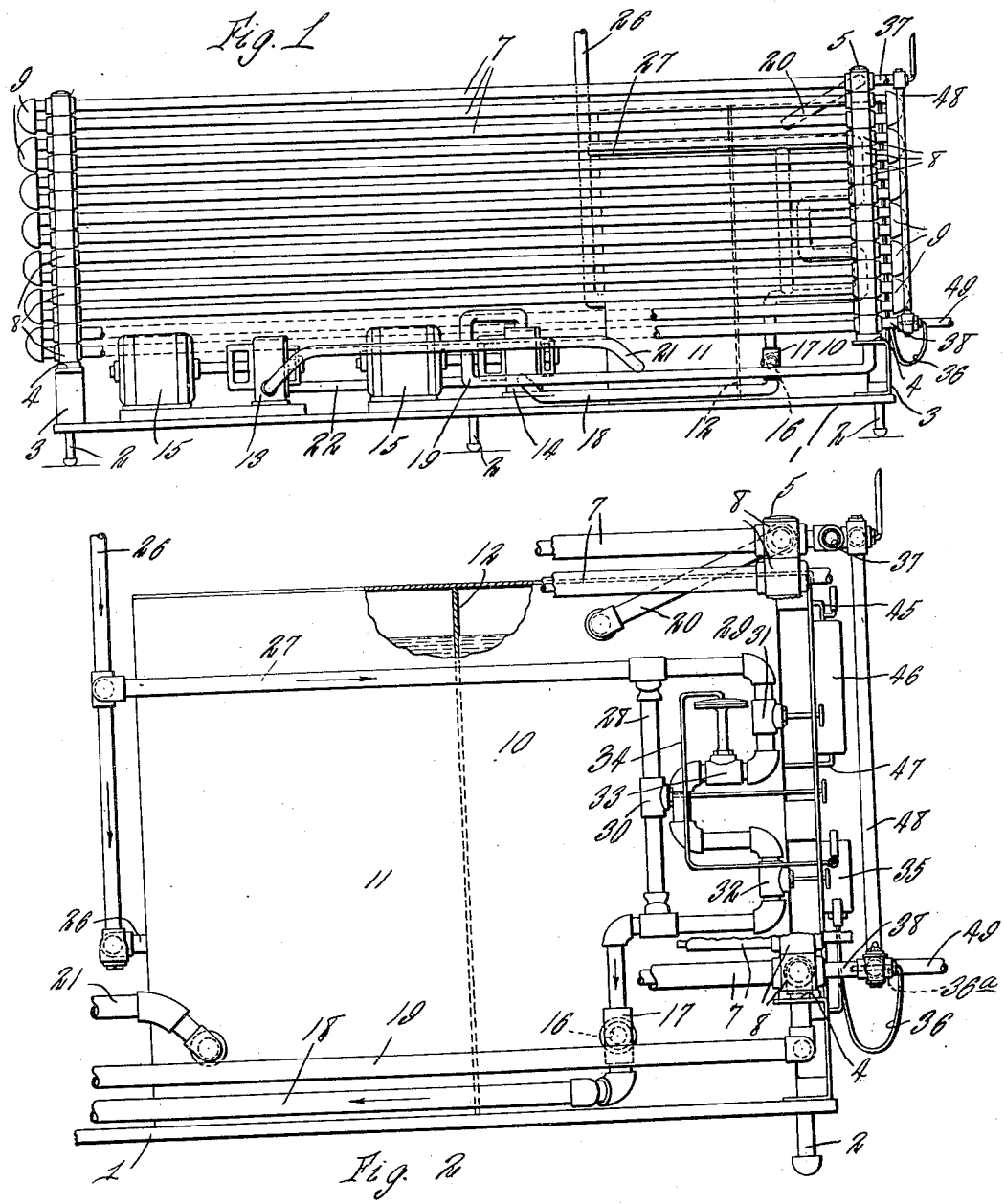

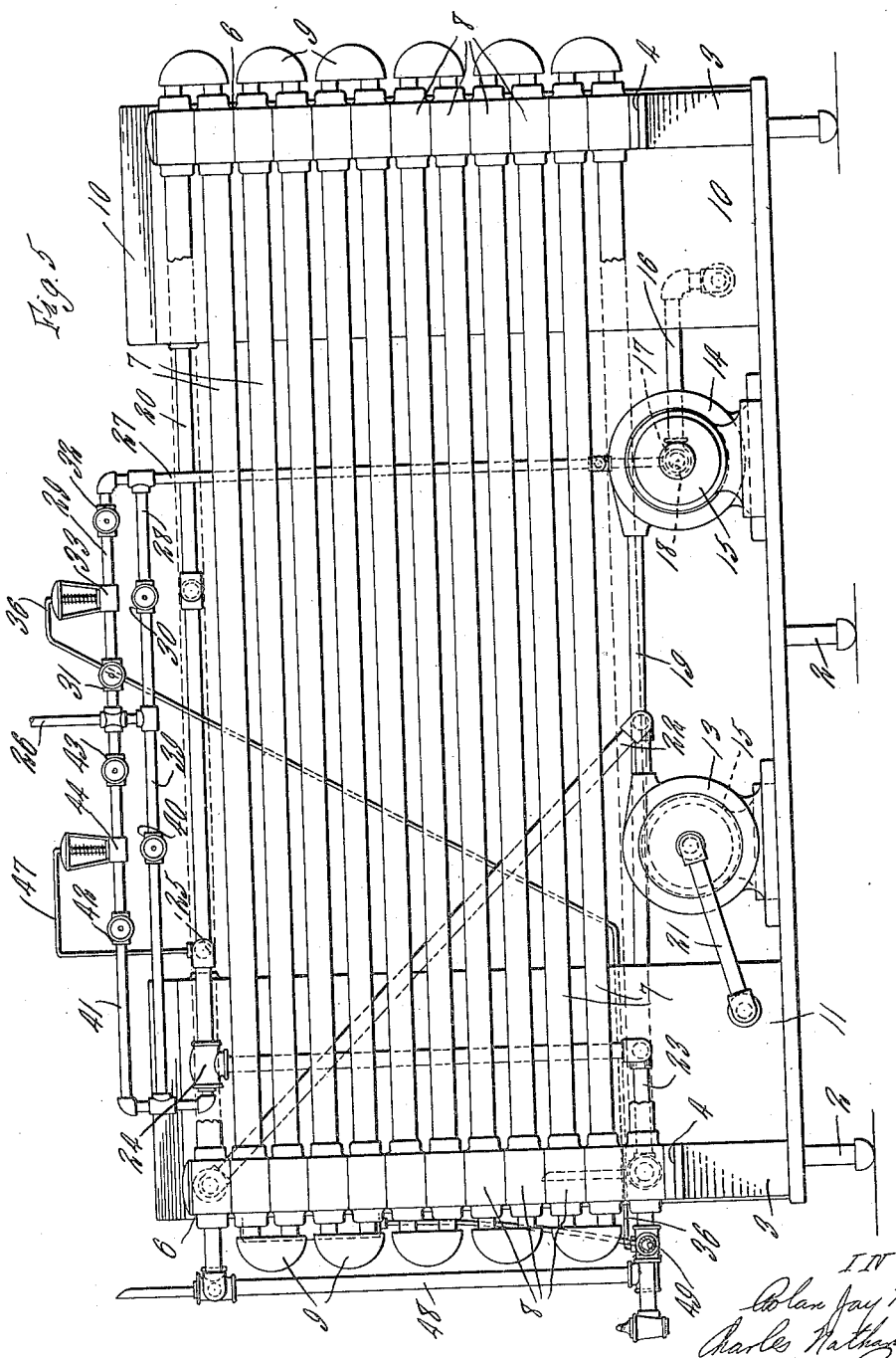

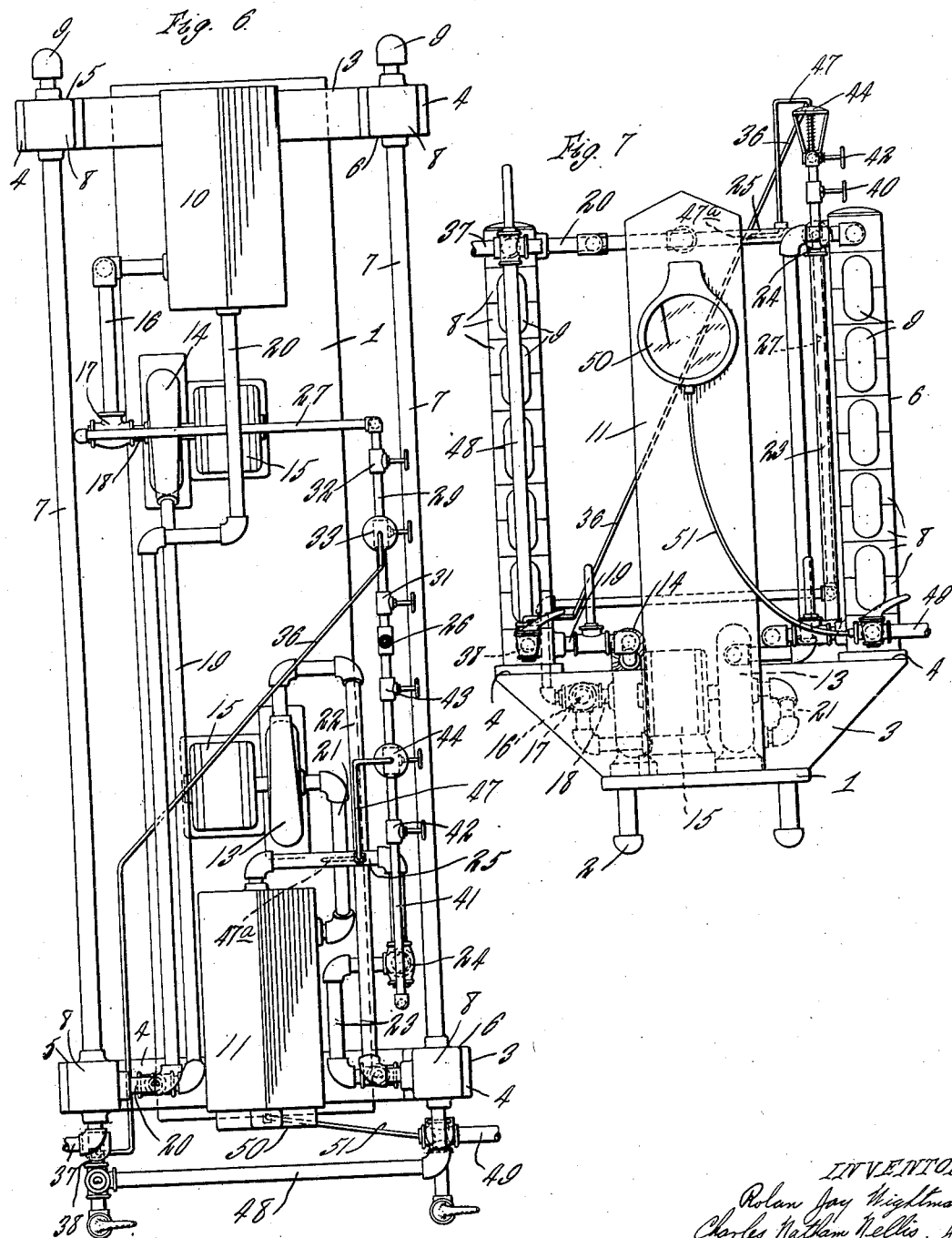

Patented Dec. 22, 1931

1,837,306

UNITED STATES PATENT OFFICE

ROLAN JAY WIGHTMAN AND CHARLES NATHAN NELLIS, JR., OF LITTLE FALLS, NEW YORK, ASSIGNORS TO CHERRY-BURRELL CORPORATION, OF WILMINGTON, DELAWARE, A CORPORATION OF DELAWARE

LIQUID HEATING APPARATUS

Application filed December 26, 1930. Serial No. 504,738.

This invention relates to the heating of liquids such as milk, and especially to the heating of milk for pasteurizing purposes.

In the pasteurization of milk by the methods ordinarily practiced, the milk is supposed to be heated to a specified legal temperature and there held for the length of time necessary for pasteurization, the holding time varying with different temperatures and being shorter with higher temperatures. Most cities and States specify a particular temperature as legal for the pasteurization of milk. For instance, some specify 143° F. and others 145° F. as the legal temperature. A pasteurizing temperature of 143° F. gives a leeway of about one to two degrees between that temperature and the temperature of 145°, or more exactly 144½° where the cream line of the milk begins to be impaired. A specified pasteurization temperature of 145° or higher therefore makes it extremely difficult to comply with the law and not injure the cream line. It is very important to heat the milk fully up to the specified legal temperature, whatever that may be, and not allow it to drop below that temperature, but it is also important, in order to prevent injury to the cream line, not to overheat the milk or permit to remain above that temperature where injury to the cream line begins.

Much difficulty has been experienced, and great care required in the pasteurizing processes and apparatus heretofore used to attain these results, that is to heat the milk accurately fully up to the required temperature and not let it drop below that temperature, and yet not over heat the milk.

An object of this invention is to provide an improved apparatus by which a liquid such as milk may be heated in a continuous process to a uniform predetermined temperature, with the variation in the temperature of the heated liquid confined within narrow, predetermined limits; in which the parts in contact with the liquid, such as milk, will be readily accessible for cleaning purposes; which will have a maximum capacity and occupy a minimum of floor space; in which the controls will be conveniently arranged; in which all parts of the apparatus will be conveniently accessible for assembly, inspection and repairs, and which will be relatively simple, compact and inexpensive.

Various other objects and advantages will be apparent from the following description of an embodiment of the invention, and the novel features will be particularly pointed out in connection with the appended claims.

In the accompanying drawings:

Fig. 1 is a side elevation of a liquid heating apparatus constructed in accordance with this invention and representing one embodiment thereof;

Fig. 2 is a side elevation, on a larger scale, of the right hand portion of Fig. 1, most of the heat exchange pipes having been removed or broken away to show parts otherwise concealed thereby;

Fig. 3 is a side elevation similar to Fig. 2, but showing the opposite side of the device at the same end;

Fig. 4 is an end elevation of the same;

Fig. 5 is a side elevation of apparatus also constructed in accordance with the invention, but illustrating another embodiment thereof;

Fig. 6 is a plan view of the same, and

Fig. 7 is an end elevation of the same.

In the embodiment of the invention illustrated in Figs. 1–4, the supporting frame includes a platform 1, Fig. 1, which may be supported above the floor on which it rests by suitable legs 2, and is provided at its ends with upright ends 3. The ends 3 are provided along opposite side faces with shoulders 4, Fig. 4, on which a pair of heat exchange units 5 and 6 are supported. The heat exchange unit 5 constitutes a preliminary or first stage heater, and the other unit 6 constitutes what may be known as a final or second stage heater.

Each exchange unit consists of a plurality of runs or sections of double passage conduits 7 connected in series, so that when a fluid is passed through one of the passages of the unit from end to end, and another fluid similarly passed through the other passage of that unit, the fluids in the two passages of the unit will be in heat exchange relation to one another during their travel through the unit, yet will be kept entirely separate from one another during the heat exchange.

In the particular example of the invention, the liquid, such as milk, which is to be heated, is passed through the inner passage of the conduit, and the heating liquid, such as hot water, is passed through the other or outer passage, which is the annular passage between the inner and outer pipes forming each stretch or run of the conduit. The outer pipes of each conduit terminate in headers or blocks 8 which abut one another at corresponding ends, and are connected alternately in series to one another, so that the outer passages of the conduits will be connected in series to one another from one end of the unit to the other.

The inner pipes or conduits extend beyond the blocks or headers 8 and are connected alternately in series to one another by suitable removable coupling elbows or devices 9, as usual in this type of heat exchange unit. The units extend vertically along opposite sides of the frame, as shown clearly in Fig. 4, and the lower ends of such units are spaced somewhat above the platform 1 to enable access to be had to the space between the units.

A pair of tanks 10 and 11 are disposed on the platform 1 between the heat exchange units 5 and 6, and in the form of the invention shown in Figs. 1-4, both tanks are arranged at one end of the platform. These tanks may be created by dividing a reservoir into two compartments by a partition 12, Figs. 1, 2 and 3. Upon the remaining space of the platform 1, between the units 5 and 6, circulating pumps 13 and 14 may be mounted, each pump being operated by a motor 15, or both pumps may be operated by a common motor. Since the lower edges of the units 5 and 6 are spaced somewhat above the platform 1, and since the motors 15 and pumps 13 and 14 rest upon the platform, the pumps and motors will be conveniently accessible for installation, inspection or repairs through the space below the units, shown clearly in Fig. 1, as well as from the top and rear end.

The liquid used as the heating medium is commonly water, but it will be understood that any suitable fluid medium may be employed.

Two separate, closed circulatory systems are provided for the heating liquid or water, each system including a tank, a pump and the outer passage of a heat exchange unit. For the preliminary or first stage heat exchange unit, water is withdrawn from the tank 10 through a pipe 16, Fig. 2, opening directly into one passage of a steam injector 17, and from the injector the water passes through a pipe 18 to the inlet side of the pump 14, Fig. 1. A pipe 19 conveys the water from the outlet side of the pump 14 to the lower end of the water passage of the preliminary or first stage heater unit 5, see Fig. 4.

The water passes through the outer passage of the unit 5 and progressively rises and leaves the topmost conduit of the unit by a pipe 20 which communicates with the upper part of the tank 10, thus completing a cycle of circulation between the tank 10, the injector 17, the pump 14 and the water passage of the heat exchange unit 5.

Similarly water is withdrawn from the tank 11 by means of a pipe 21, Figs. 1 and 2, and conveyed by that pipe to the inlet side of the pump 13. Water is conveyed from the outlet side of the pump 13 by means of a pipe 22 to the lower end of the water passage of the unit 6, as shown in Fig. 4. This water rises through the unit 6 and is withdrawn from the top of this unit by a pipe 23, Figs. 3 and 4, and by it conveyed to a heater or steam injector 24. From the injector 24 a pipe 25 returns the water to the tank 11, thus completing another circulation cycle.

Steam for the heating of the water in both closed systems is conveyed to the apparatus by a pipe 26. From the pipe 26, Fig. 2, a branch 27 leads to a point adjacent the right hand end 3, Figs. 1 and 2. The pipe 27 divides, one section 28 passing directly to the steam injector 17 and controlled by a valve 30, the other section 29 bypassing the valve 30 and containing therein two valves 31 and 32 in spaced relation to one another. A third valve 33 is located in the pipe section 29 between the valves 31 and 32, for a purpose which will appear presently.

The valves 30, 31 and 32 may be of the manually operated type, but the valve 33 is intended to be operated automatically, and is shown as of the diaphragm type which is operated by compressed air supplied thereto by a pipe 34. The pipe 34 passes to a controller 35, Fig. 4, mounted on a suitable panel on the front end wall 3. The passage of air through the controller 35 is controlled in a well known manner by a thermal device including a tube 36 leading from the controller to a bulb 36a containing a suitable expansible or vaporizable fluid and located in the milk passage at the lower end of the unit 5.

The milk to be heated is admitted to the upper end of the unit 5 by means of a pipe 37, Fig. 4, descends through the inner or milk passage of the unit 5, and leaves the unit 5 through a pipe 38. The valve 33 is therefore operated automatically in accordance with temperature fluctuations of the milk leaving the preliminary heater unit 5. The valve 30 is normally closed and the valves 31 and 32 are normally open, so that the steam passing through the pipe 27 to the injector 17 will be regulated by the diaphragm operated valve 33 under the control of the temperature of the milk leaving the unit 5.

Under this control, sufficient steam is added to the circulating water leaving the tank 10, at the injector 17, to insure a temperature of the water passing through the unit 5 sufficient to heat the milk to the temperature desired for the preliminary stage, such as to a temperature of about 138° F. Where the milk entering the first stage heater unit 5 comes directly from a regenerator unit, its entering temperature will be higher than when the regenerator is not used, or during the starting operation, therefore less steam will be required to heat the water circulated through the tank 10 to a temperature such that the milk leaving the unit 5 will have the desired temperature, such as approximately 138° F.

The steam pipe 26 also passes to the opposite side of the tanks, as shown in Figs. 2 and 3, and there divides, one branch pipe 39 passing directly to the injector 24, Fig. 3, and having therein a controlling valve 40 of the manually operated type. The other branch pipe 41 of this section of the pipe 26 bypasses the valve 40 and is provided with two valves 42 and 43 of the manually operated type which are spaced apart along the pipe a short distance. A diaphragm-operated valve 44 is arranged in the pipe 41 between the manually-operated valves 42 and 43. The valve 40 is normally closed and the valves 42 and 43 are normally open, with the result that the steam normally reaches the injector 24 through the pipe 41 under the control of the diaphragm-operated valve 44. The valve 44 is operated by compressed air supplied through a pipe 45 leading to the controller 46 arranged on the control panel shown at the end 3 in Fig. 4.

The controller 46 may be similar to the controller 35, and a tube 47, similar to the tube 36, leading to a thermostatic bulb 47a disposed in the water pipe, 25, Fig. 3, so that the controller 46 will respond automatically to variations in the temperature of the water entering tank 11 through the pipe 25, and will control the admission of heat to the water passing through the unit 6 in such a manner that the water will always leave the unit 6 at a desired temperature, approximately that desired in the final temperature of the milk.

The operating stems of the valves 30, 31 and 32 and 40, 42 and 43 are preferably extended through the end panel shown in Fig. 4, so as to be conveniently accessible for manipulation. The manually operated valves 30, 31, 32, 40, 42 and 43 are only operated from the positions specified in case of faulty operation of the diaphragm-operated valves 33 and 44, or where for some special reason manual control of the steam supply is desired. If the diaphragm-operated valve 33 should fail to operate, for example, the valves 31 and 32 may be shut off and the valve 30 opened an amount necessary to admit the requisite steam to the injector 17, the amount being varied by a suitable operation of the valve 30, as desired.

Suitable indicating thermometers are provided at various points in the milk and water passages of each unit, so that by observation of these, an attendant may understand how to regulate the steam valves when manual control is being used. When the diaphragm-operated valve 44 is inoperative or its use is not desired, the valves 42 and 43 may be shut off and the valve 40 operated in a similar manner to regulate the flow of steam to the injector 24.

The milk leaving the lower end of the unit 5 through the pipe 38 is conveyed through a riser pipe 48, Fig. 4, to the milk inlet passage at the upper end of the unit 6. The milk is withdrawn from the lower end of the unit 6 through a pipe 49, and conveyed to a suitable holder or cooler.

In the operation of this apparatus, in pasteurizing milk, for example, the controller 35, Fig. 4, is set to regulate the heat admitted to the water passing through the unit 5 so that the heated milk leaving the unit 5 will have the desired temperature, such as of approximately 138° F., and the controller 46 is set to regulate the admission of heat to the water circulating through the unit 6, so that the water in the unit 6 will be approximately that desired for the final milk temperature or not more than about one degree above the desired final temperature for the milk.

The area of the heat exchange surface in each unit is made amply large, and a sufficient volume of heating medium is circulated through the units 5 and 6 to produce the desired temperatures in the milk circulated through the units. For example, for the unit 5, the volume of water circulated is preferably about three times that of the milk flow, which means that the water entering the unit 5 will be around 142° F. when the entering temperature of the raw milk is 40° more or less, or the water may enter at about 140° F. when the entering milk temperature is 120° F. more or less. The milk enters the final or second stage heating unit 6 from the unit 5 at a temperature of about 138° F. and is heated to the final pasteurizing temperature. If this temperature be 143° or 145° F., it is necessary to raise the temperature of the milk in the unit 6 only about 5 to 7 degrees.

The water flow through the unit 6 in such a case is preferably about four or five times that of the milk flow. This combination of a small rise in the milk temperature, with a large heat exchange surface and a large flow of water in proportion to the rise in the milk temperature, brings the water and milk temperatures so close together that it makes a very close control of the final milk temperature and danger of scorching or overheating of the milk is effectively prevented. In practice the temperature of the milk may be accurately controlled to within one degree, which means a variation of one-half of a degree each way, and the incoming water temperature in the unit 6 is usually maintained above the final milk temperature about one degree.

It will be noted that the injector 24 in the return line from the unit 6 is arranged to supply the steam before the water enters the tank, and by placing the temperature control bulb of the tube 47 in the water circulating line conveying the water to the tank, a uniform temperature of the water in the tank and system may be insured.

The embodiment of the invention illustrated in Figs. 5–7 is similar to that shown and described in connection with Figs. 1–4, with the exception that in Figs. 5–7 the tanks 10 and 11 are arranged at opposite ends of the platform, as shown in Fig. 6, and the pumps and operating motors are disposed between the tanks on the platform 1, and also that the air tubes 34 and 45 are omitted and the tubes 36 and 47 operate the steam control valves 33 and 44 directly, although they may be air-operated if desired, as in Figs. 1–4. A recording thermometer 50 with thermal tube 51 may be connected to the outlet 49 to record the temperatures of the outgoing milk. The controls for the steam lines are provided along one side of the device, such as just above the unit 6, as shown in Figs. 6 and 7, instead of being at the end panel, as in Figs. 1–4. Otherwise the apparatus is constructed and operated the same as for Figs. 1–4, and the corresponding parts are designated by the same numerals in both embodiments of the invention.

It will be understood that the device may be used for the heating of other liquids than milk where accurately controlled heating is desired, and that milk or liquid to be heated may be heated to different temperatures where desired. For example, in one system which is used to some extent for the pasteurization of milk, the milk is heated to a final temperature of about 165° F. and held at that temperature for about ten seconds, and then cooled. This apparatus gives the uniform, accurate temperature of the heating and is very satisfactory for use in connection with that system of pasteurization.

It will be noted that in both forms of the apparatus, the parts are arranged in a very compact manner, so as to provide maximum capacity while occupying a minimum of floor space, yet all parts to which access may be necessary or desirable are conveniently accessible, and the controls are simple and conveniently accessible.

It will be understood that various changes in the details which have been hereindescribed and illustrated in order to explain the nature of the invention, may be made by those skilled in the art within the principle and scope of the invention as expressed in the appended claims.

We claim as our invention:

1. A multiple stage, liquid heating apparatus comprising a frame, a double passage heat exchange unit arranged along one side of the frame and serving as a preliminary heater, a second double passage, heat exchange unit extending along the opposite side of the frame and serving as a final heating unit, a pair of tanks arranged on said frame between said units, connections by which a liquid to be treated may be passed in series through one passage of said units, means including connections between each of said tanks and one of said units for circulating a heating fluid through the other passage of said unit, means for supplyng heat to the heating fluid circulated through each tank and unit, and means for regulating the heat admitted to the fluid circulated through each unit independently of the heat admitted to the fluid circulated through the other unit.

2. A multiple stage, liquid heating apparatus comprising a frame, upright heat exchange units spaced from one another and disposed along opposite sides of and supported on said frame, a pair of tanks supported on said frame between said units, means by which a liquid in each tank may be circulated through one of said units, means for supplying heat to the liquid circulated through each tank, and means for passing a liquid to be treated in heat exchange relation to said units in succession.

3. A multiple stage liquid heating apparatus comprising a frame, a pair of upright heat exchange units supported on said frame, one adjacent each of the opposite sides of said frame, a pair of tanks mounted on said frame between said units, means including connections from each tank to one of said units for circulating a heating fluid from the tank through said unit, means including connections for conveying a liquid to be treated in heat exchanging relation to said units in series, means for supplying heat to the fluid circulated through each tank, means responsive to the temperature of the liquid being treated in the first unit for controlling the amount of heat admitted to the said fluid circulating through that unit and related tank, whereby the liquid will leave that unit substantially at a selected temperature, and means responsive to the temperature of the fluid being circulated through the other unit and its related tank for controlling the amount of heat added thereto, whereby said fluid circulated through the second unit will leave that unit at substantially a predetermined temperature.

4. A multiple stage, liquid heating apparatus comprising a frame, upright heat exchange units mounted on said frame in spaced relation to one another, tanks disposed on said frame between said units, pumps also mounted on said frame between said units, and connections between said tanks, pumps and units, whereby two closed liquid circulatory systems are created, each system including a pump, a tank and a unit, means for supplying heat separately to the liquid circulated in each system, and means for passing a liquid to be treated in heat exchanging relation to said units in series.

5. A multiple stage liquid heating apparatus comprising a base, a pair of heat exchange units supported on said base in spaced relation to one another, a pair of tanks disposed on said base between said units, a pair of pumps also mounted on said base between said units, connections between said pumps, tanks and units to form two separate, closed circulatory systems, each including a pump, a tank and a unit, means for supplying heat to the heating liquid circulating through each system, means for passing a liquid to be treated in heat exchange relation to said units in series, whereby said liquid to be treated will be given a preliminary heating by one unit, and a final heating by the other unit, means automatically responsive to the temperature of the liquid being treated as it leaves the preliminary unit for regulating the amount of heat supplied to the circulatory system of that unit, and means automatically responsive to the temperature of the heating liquid in the other circulatory system for regulating the heat supplied to that system.

6. A multiple stage liquid heating apparatus comprising a base, a pair of heat exchange units supported on said base in spaced relation to one another, a pair of tanks disposed on said base between said units, a pair of pumps also mounted on said base between said units, connections between said pumps, tanks and units to form two separate, closed circulatory systems, each including a pump, a tank and a unit, means for supplying heat to the heating liquid circulating through each system, means for passing a liquid to be treated in heat exchange relation to said units in series, whereby said liquid to be treated will be given a preliminary heating by one unit, and a final heating by the other unit, means automatically responsive to the temperature of the liquid being treated as it leaves the preliminary unit for regulating the amount of heat supplied to the circulatory system of that unit, means automatically responsive to the temperature of the heating liquid in the other circulatory system for regulating the heat supplied to that system, and means for bypassing heat around each of said regulating means including a plurality of controlling valves, said valves being exposed for convenient access from the exterior of the enclosure formed by said units, said base and said tanks.

7. A multiple stage liquid heating apparatus comprising a base, a pair of heat exchange units supported on said base in spaced relation to one another, a pair of tanks disposed on said base between said units, a pair of pumps also mounted on said base between said units, connections between said pumps, tanks and units to form two separate, closed circulatory systems, each including a pump, a tank and a unit, means for supplying heat to the heating liquid circulating through each system, means for passing a liquid to be treated in heat exchange relation to said units in series, whereby said liquid to be treated will be given a preliminary heating by one unit, and a final heating by the other unit, means automatically responsive to the temperature of the liquid being treated as it leaves the preliminary unit for regulating the amount of heat supplied to the circulatory system of that unit, means automatically responsive to the temperature of the heating liquid in the other circulatory system for regulating the heat supplied to that system, and means for by-passing heat around each of said regulating means including a plurality of controlling valves, said valves being arranged at one end of said frame between said units, and accessible for operation from the end of the frame.

8. A multiple stage, liquid heating apparatus comprising a frame, heat exchange units disposed in spaced relation to one another on opposite sides of said frame, a pair of tanks and a pair of pumps mounted on said frame between said units, connections between said pumps, tanks and units to form two separate liquid circulatory systems each including a pump, a tank and a unit, means for supplying heat to a heating liquid in each of said systems separately, means for passing a liquid to be treated in heat exchange relation to said units in succession, the direction of flow of said liquids in each unit being counter to one another, means for regulating the amount of heat added to the liquid in the circulatory system of the first unit, to which the liquid to be treated passes, in response to the temperature of the liquid to be treated leaving that unit, and means responsive to the temperature of the heating liquid in the circulatory system leaving the other unit for regulating the quantity of heat added to the heating liquid in the system of that unit.

9. A multiple stage, liquid heating apparatus comprising a platform, a pair of upright heat exchange units disposed on said base in spaced relation to one another, a pair of tanks mounted on said base in the space between said units, a pair of pumps on said platform somewhat below the lower edge of said units, connections between said pumps, tanks and units to form two closed circulatory systems, each system including a tank, a pump and a unit, means for supplying heat to a heating liquid in each system, and means for regulating the heat supplied to each system selectively and individually.

ROLAN JAY WIGHTMAN.
    CHARLES NATHAN NELLIS, Jr.